March 2, 1965   E. H. ELLMS ET AL   3,171,449
APPARATUS FOR BULK HANDLING OF MATERIALS
Filed Nov. 28, 1960   3 Sheets-Sheet 2
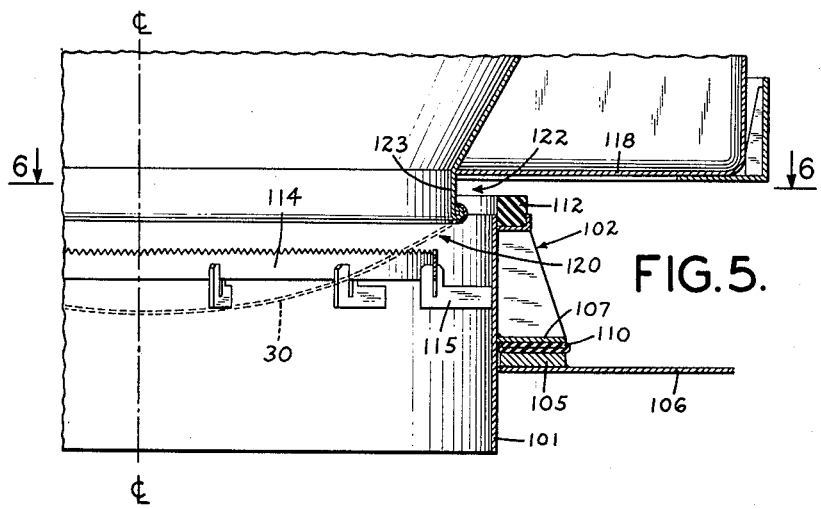
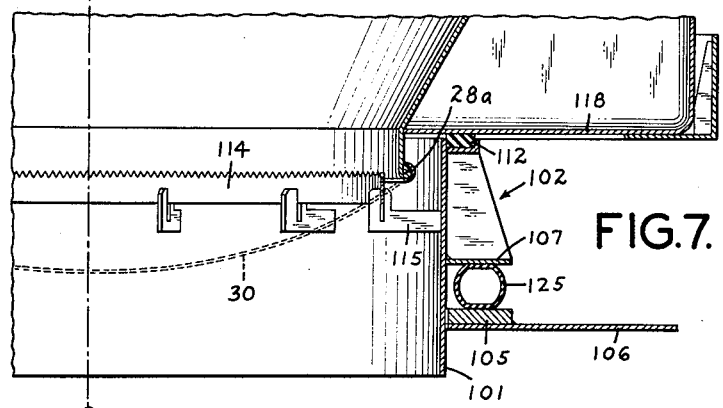
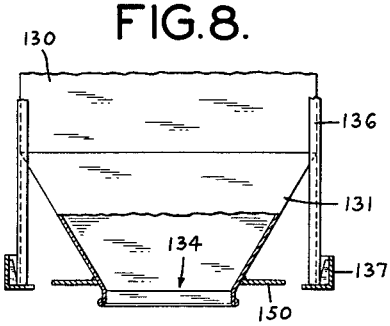
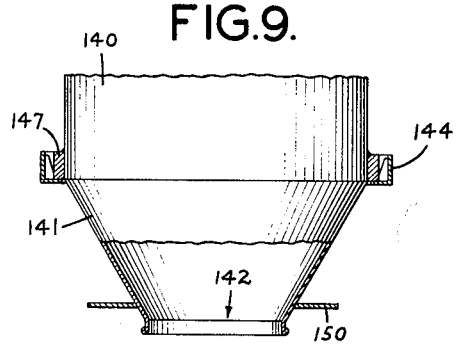
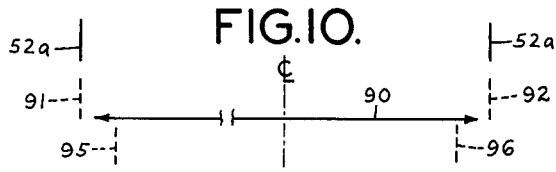
INVENTORS:
EDWARD H. ELLMS
JOHN E. ZIRKLE
MELVIN E. MYERS
DONALD L. STEERS
BY
ATTORNEY

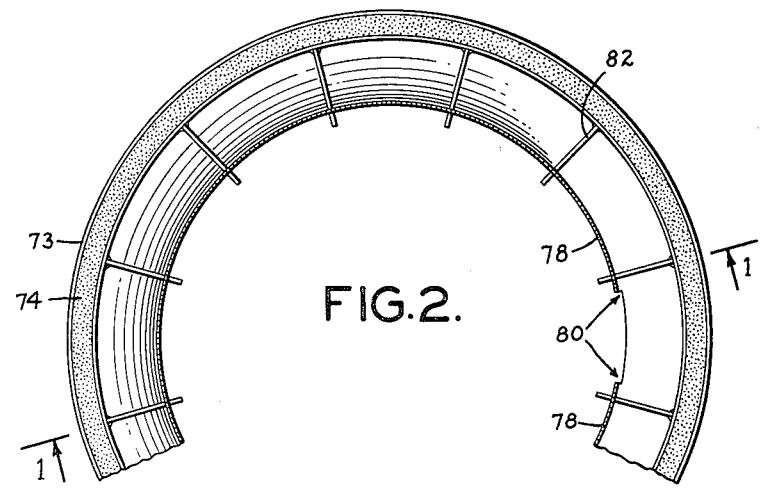
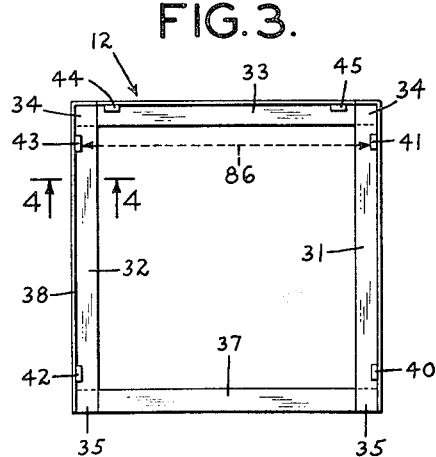
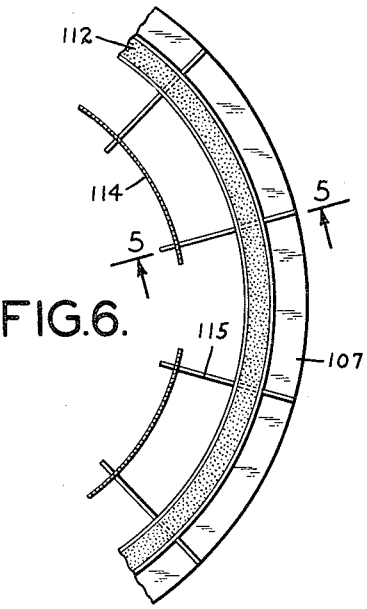
INVENTORS:
EDWARD H. ELLMS
JOHN E. ZIRKLE
MELVIN E. MYERS
DONALD L. STEERS United States Patent Office 3,171,449
Patented Mar. 2, 1965

3,171,449
APPARATUS FOR BULK HANDLING OF MATERIALS
Edward H. Ellms, Bogota, N.J., Melvin E. Myers, Bedford, Mich., and Donald L. Steers, Toledo, and John E. Zirkle, Fremont, Ohio, assignors to Allied Chemical Corporation, New York, N.Y., a corporation of New York
Filed Nov. 28, 1960, Ser. No. 72,008
17 Claims. (Cl. 141—330)

This invention relates to apparatus for handling bulk materials, especially more or less pulverized solid materials which are likely to create dust abatement problems.

Many industrial operations involve transportation of pulverulent dusty solid materials in large bulk containers, and ultimate transfer of the material from a container to e.g. a reactor, blender or other receptacle in which the material is further processed. Transfer of such materials from one container to another gives rise to familiar dusting problems including dust nuisance, escape of material to the atmosphere with resultant loss of material, explosion hazard, and contamination of material during transfer.

The major object of this invention is to provide an easily constructed combination of apparatus which may be readily operated to substantially eliminate dusting difficulties during transfer of large bulk quantities of dusty solid materials from one container to another.

The invention, and the objects and advantages thereof may be more fully understood from the following description taken in connection with the accompanying drawings, in which FIG. 1 is a view, partly in vertical elevation and partly in vertical diametric section, of one embodiment of the invention, sectional portion of FIG. 1 being taken generally along the line 1—1 of FIG. 2;

FIG. 2 is a fragmental top plan view of a conduit-connector unit taken approximately on the line 2—2 of FIG. 1;

FIG. 3 is a top plan view, on a reduced scale, of a container supporting rack;

FIG. 4 is an enlarged vertical section taken on the line 4—4 of FIG. 3;

FIG. 5 is a fragmental diametric vertical section of another embodiment of the invention showing related elements in relatively inoperative position, FIG. 5 being taken generally along the line 5—5 of FIG. 6;

FIG. 6 is a fragmental top plan view of the type of conduit-connector shown in FIG. 5 and is taken approximately on the line 6—6 of FIG. 5;

FIG. 7 is a fragmental vertical diametric section similar to FIG. 5 but showing the corresponding elements in operative position;

FIGS. 8 and 9 are diagrammatic, reduced scale, partly elevational and partly vertical sectioned illustrations of modifications, and FIG. 10 is a diagrammatic detail.

Figure 1:
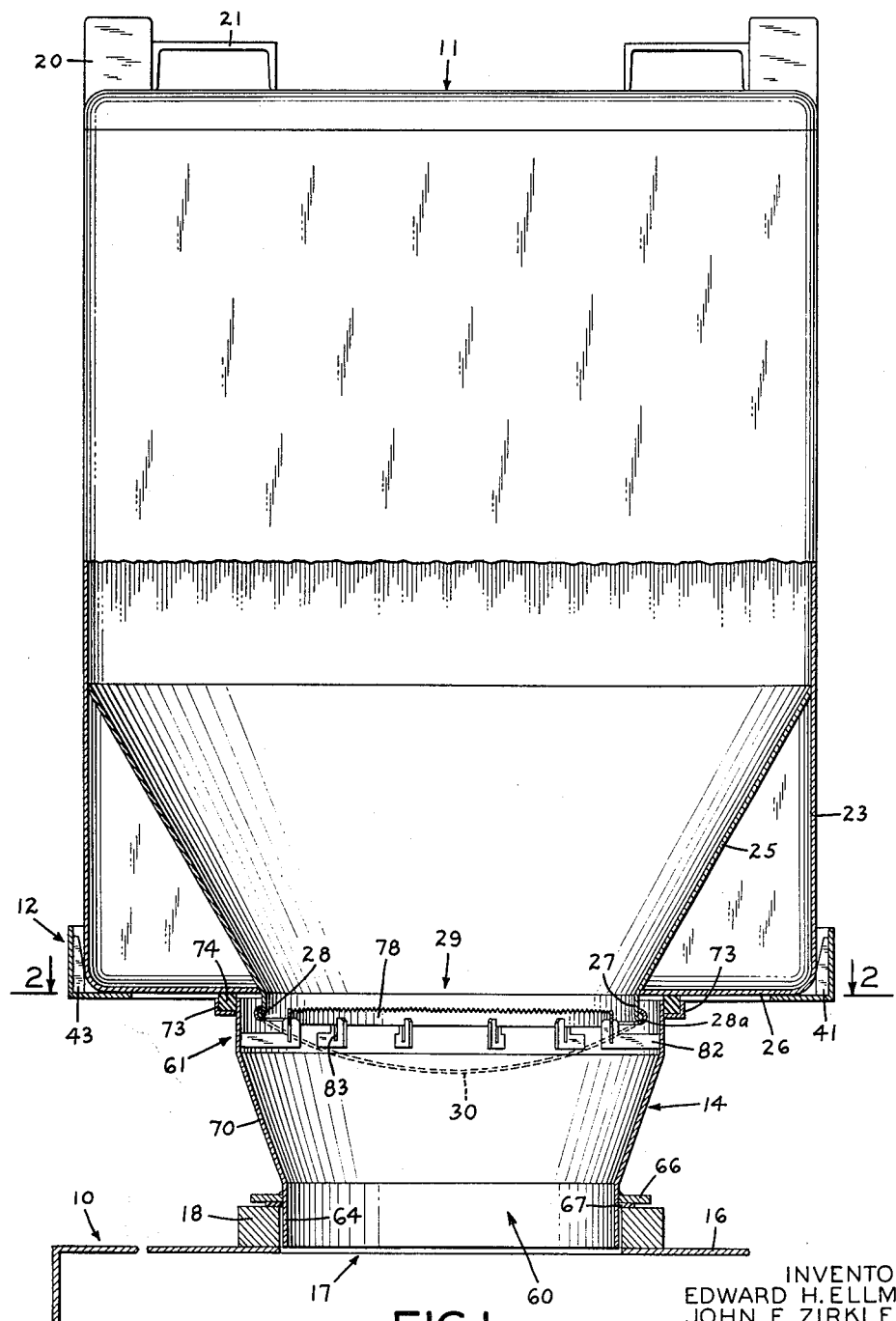

The embodiment of the material handling apparatus of the invention exemplified in FIG. 1 includes in general a receptacle 10 into which it is desired to feed material; a rigid-walled transportable bulk container 11 adapted to hold and to be used for transportation of e.g. pulverulent dusty solid material to be fed into the receptacle 10; a rack 12 for supporting container 11 in vertically inverted position; and a connector-conduit 14 which, in accordance with the invention, facilitates substantially dustless transfer of material from container 11 into receptacle 10.

The receptacle 10, shown only fragmentally in vertical longitudinal section, may be any unit of industrial apparatus into which it is desired for any purpose to feed pulverulent solid material which is inherently dusty and which creates dusting problems on transfer from one container to another or from one process stage to another. For example, receptacle 10 may be a reactor in which one of the reactant materials is a pulverulent solid fed thereto as such, or receptacle 10 may be a blender or mixer into which materials including at least one pulverulent solid material is fed for mixing with other materials initially in solid or other physical form. In FIG. 1, 16 indicates the top side of a receptacle, reactor or blender having a circular inlet port 17 provided at the periphery with a fixedly attached annular reinforcing and guide ring 18 the inner vertical face of which is coextensive with the vertical edge of the inlet port 17.

In FIG. 1, container 11 is shown bottom side up, in vertically inverted position, and seated on supporting rack 12. Container 11 is typical of various forms of rigid-walled transportable bulk containers, sometimes referred to as "tote" boxes, employed to transfer relatively large quantities of materials e.g. 500–2000 lbs./unit, from one place to another. The particular container illustrated is flat-bottomed, flat-topped, substantially square in horizontal cross-section and provided on four bottom corners with legs 20 associated with lugs 21 arranged, when the container is in normal upright position, so as to receive the lifting forks of a lift truck of the type equipped with a rotating head and commonly used to transport, invert and place a container in up-ended position over a receiving receptacle. At the upper end 23, exteriorly the container is likewise square in horizontal cross-section, although interiorly the container is formed with a frusto-conical wall 25 the smaller circular end of which is attached as by welding to the contiguous portion of flat top 26 of the container. The small end of wall 25 merges with a short circular neck or throat 27 terminating in a circumferential bead 28. Cone-like wall 25 serves, when the container is in inverted position, to funnel the container contents to and thru a circular discharge port 29 which is bounded preferably by the circular neck 27.

Prior to use in practice of the invention, container 12 rests on a floor in normal top-side-up position and is filled or substantially filled with the pulverulent solid material to be eventually charged into e.g. receptacle 10. In accordance with one feature of the invention, the container discharge port 29 (FIG. 1) is covered with a flexible, rupturable membrane or diaphragm 30 which in this particular instance may be circular and may have an outside diameter say 2–4 inches greater than the outside diameter of the bead 28 on throat 27. The diaphragm may be secured tightly to the bead 28, tautly covering port 29, by means of a circular clamping ring 28a (FIG. 1) of well known construction and operation. Subsequently, during practice of the invention, when the container 11 is turned up-side down, the diaphragm, prior to being ruptured, assumes a downwardly distended, partly spherelike surface represented by the dotted line 30 particularly of FIG. 5.

In accordance with practice of the invention, when the container 11 is in the vertically inverted position co-axially over the inlet port 17 of receptacle 10, the weight of the container and contents thereof is supported by the rack 12 shown generally in FIG. 1 and in reduced scale horizontal plan in FIG. 3. Rack 12 comprises side angle irons 31 and 32 welded rigidly to rear angle irons 33 as indicated at rear corners 34. The under sides of the forward ends of the horizontal legs of side irons 31 and 32 (lower part of FIG. 3) may be welded as at 35 to the upper surface ends of a planar steel plate 37 which is not provided with an upstanding flange or leg corresponding to the vertical legs, e.g. 38, of the side and rear irons. Container centering side guides 40, 41, 42 and 43, and rear guides 44 and 45 are welded to the inner vertical faces of the upstanding legs of irons 31, 32 and 33 in approximately the horizontal plan positioning shown in FIG. 3. Guide 43 appears in side elevation in FIG. 4 and, as illustrated, the inwardly directed face 49 of each guide slopes inwardly and downwardly and terminates in a relatively short vertically disposed surface 52 (FIG. 4). It will be understood that guide surfaces 49 and 52 function to center the inverted container 11 in the rack 12. Vertical legs of side angle irons 31 and 32 and of rear angle iron 33 may be 5–8 inches high, and since front plate 37 is planar and is without a vertical leg, it will be seen that rack 12 provides a shelf-like support which is open at the front side to facilitate truck placement of a vertically inverted container on the rack from the front side of the apparatus. If desired, and particularly if head room is of no particular importance, plate 37 may be replaced by a duplicate of rear angle iron 33.

In all embodiments of the invention, the container supporting or seating surfaces of the rack are located in a horizontal plane a selected distance above the upper surface of top 16 of a receptacle 10 which is a piece of equipment having fixed relation to the floor of a plant. Laterally, rack 12 is located so that the vertical axis of the horizontally disposed rack is co-axial with the vertical axis of the inlet port 17 of the receptacle. Rack 12 is maintained rigidly in the position by suitable steel framework not shown.

The conduit-connector of FIG. 1 includes an open lower outlet end 60 and an open upper end 61. The lower end is circular in horizontal section, and has a diameter such that the short cylindrical section 64 sets snugly within ring 18 and the circumference of inlet port 17 of the receptacle. An annular flange 66, welded to section 64, provides for seating the connector on the ring 18, and an intervening gasket 67 together with the snug fit of the lower end of the connector within ring 18 afford a peripheral, substantially dust-tight fit between the lower end of the connector and receptacle inlet port. The upper end of the connector has diametrical and peripheral dimensions greater than those of the ring 28a which clamps the rupturable diaphragm in place over the container discharge port 29. In situations in which the diameter of the container discharge port 29 is approximately equal to or greater than the diameter of the receptacle inlet port 17, part of the wall of the connector 14 is formed with a conical transition portion 70 sloped sufficiently so that the upper cylinder-like section of the connector wall has diametrical and peripheral dimensions sufficiently larger than those of the clamping ring 28a, so that the upper end of the connector envelopes the clamping ring 28a and the associated container outlet neck 27, respective dimensional differences being such that when a container is in the vertically inverted position indicated in FIG. 1, container neck 27 and the clamping ring 28a project into the upper end of the connector 14 with a small but practicable annular clearance and with what may be designated as a substantially nesting relation.

As seen in FIGS. 1 and 2, the upper end of the connector 14 is formed with an outwardly extending annular channel 73 adapted to afford seating for an annular gasket 74 which may be a rectangularly cross-sectioned strip of latex coated polyurethane or rubber foam or other suitable compressible and resilient material. When not under compression, gasket 74 may project as much as an inch above the top edge of channel 73, and in any case the vertical thickness of the gasket is chosen so as to provide for compressibility above the top edge of the channel of say 0.5–1 inch. In the particular connector of FIG. 1, positioning of the container supporting surface of rack 12, or the vertical dimension of the connector 14, or both, are selected or adjusted so that the upper edge of the connector and also the upper edge of the channel 73 lie in a horizontal plane just slightly below the level of the supporting surfaces of rack 12, that is, exclusive of compressibility of the gasket the top edge of the connector may be just short of level with the container supporting surface of the rack.

Connector 14 also includes means which, when the container is seated in inverted position on the rack, cut the diaphragm 30 so as to effect flow of solid material thru the container discharge port into the connector and so as to maintain attachment of the diaphragm material to at least a portion of the periphery of the container discharge port. Diaphragm rupturing or cutting means comprise a cutting blade 78, FIG. 1, having an upwardly directed cutting edge and supported rigidly in suitable cutting position from the inner wall of the connector. While any suitable type of cutting edge may be employed, preferably the cutter may be a flexible saw blade of 16–20 gauge, having 3–6 triangular teeth per inch, with teeth bevelled all on one side. As shown in FIG. 2, the blade 78 lies in a circular position which may comprise 80–95% of a full circle, a portion of full circular cutting of the diaphragm being omitted to the extent of relatively short arc, e.g. less than 15 degrees, indicated at 80 in FIG. 2. Arc 80 may be of any length just sufficient to provide an uncut portion of the diaphragm adequate to retain all of the cut-out diaphragm material in attachment with the periphery of the container discharge port and to prevent any of the diaphragm material from being carried thru the connector into a receptacle.

The cutting blade may be supported teeth edge up in circular position by a series of L-shaped brackets 82, shown in plan in FIG. 2 and in elevation in FIG. 1, the outer end of each bracket being welded to the inner adjacent wall of the connector 14. As apparent from inspection of FIG. 1, the vertical leg of each bracket 82 is vertically slotted as at 83 to frictionally or otherwise fixedly receive the lower edge of the cutting blade and maintain the same so that the teeth points lie in a horizontal plane of a selected vertical position, slots 83 being vertically elongated to provide readily for limited vertical adjustment of the saw blade. Positioning of supporting brackets 82 and the adjustment of the blade in bracket slots 83 are such that when the vertically inverted container 11 is seated on rack 12 and throat 27 projects into the connector inlet end, the points of the saw teeth lie in a horizontal plane at least as elevated as a horizontal plane in which lies the lowermost extremity of the clamping ring 28a, preferred positioning being such that the teeth project into the container discharge port say 0.25–1 inch above such plane, i.e. into the neck 27.

Diameter and peripheral dimensions of the circularly positioned saw blade are less than the inside diameter and peripheral dimension of the container discharge port and of circular neck or throat 27. It has been found that the spacing of the cutting blade inwardly from the adjacent inside surface of the container discharge port is of importance with regard to best mode of operation, and that such spacing is related to variations in centering of the container on the supporting rack 12.

Referring to FIGS. 3 and 4, the distance represented by the dotted line 86, FIG. 3, between the vertical faces 52 of guides 41 and 43, is chosen to substantially equal the outside width of the particular containers in use, i.e. for a 48 inch (outside measurement) square container distance 86 of FIG. 3 is 48 inches plus a "variance." From practical standpoint, outside dimensions of individual containers of a group of containers of given specifications are usually irregular and may vary to some small but significant plus or minus extent. The term "variance" is used herein to denote variance in overall outside width of a container. For practical purposes, it may be considered that variances usually are distributed about equally on either side of a container center line. It will be understood that "width" includes other corresponding dimensions such as diameter in the case of a container of circular horizontal cross-section. The relation between container width variance and container centering on the rack may be appreciated from consideration of FIG. 10. Solid line 90 indicates e.g. a 48" container width. Dotted lines 91 and 92 represent the lower outside vertical surfaces of the seating portion of a container having a plus variance of e.g. ¼". Assuming a ¼" maximum plus variance to be sufficient to handle all the containers of a group at hand, spacing apart of container guides 41 and 43, FIG. 3, is selected so that guide faces 52 (solid lines 52a, FIG. 10) are spaced apart, each equally from the rack center line, just sufficiently to accommodate a ¼" oversized container. In this situation, it will be seen that a ¼" oversize container is centered on the rack. In FIG. 10, dotted lines 95 and 96 represent the lower outside vertical surfaces of the seating portion of a container having a minus ¼" variance, i.e. ¼" narrower than the normal 48" width of the container. In this circumstance, it will be understood that if one lower end of the container is in direct contact with a guide face 52a, the container is about ¼" off-center. While FIG. 10 has been delineated on the basis of assumed variance of plus or minus ¼" in the width of the container, it will be understood that provision may be made for other plus-minus variances. Permissible variances as much as plus or minus one half inch may be encountered although, preferably variances are not more than plus or minus ¼" and may be as low as ⅛" to practically zero.

In order to prevent fouling of the cutter blade or teeth by metal-to-metal contact of the cutting edge with the lowermost extremity of a container discharge neck 27, and in order to provide adequate leeway for permissible plus or minus variances of overall widths of the containers and for resulting centering irregularities, radii of the cutting blade circles are chosen having regard to inside diameters of container discharge ports and permissible variances of container widths. Permissible variance may be represented by "x." It has been found that the relationship between the inside diameter of a container discharge port and permissible width variance and proper placement of the cutting blade in the connector is such that the radius of the blade circle is less than the inside radius of a container discharge port 29 by an amount at least 1.5 times the allowable plus or minus variance of overall container width. Thus, if permissible variance is ¼", the radius of the blade circle is ⅜" less than the radius of container discharge port 29. Preferably blade radius is less than the inside radius of port 29 by an amount about two to three times the allowable plus or minus variance. For example, if allowable variance is ¼", the radius of the blade circle is ½ to ¾" less than the inside radius of discharge port 29.

In operation of the embodiment of FIG. 1, with the container filled and in normal upright position, a diaphragm is stretched tautly across container discharge port 29 and clamped to bead 28. The diaphragm may be made of any suitable flexible rupturable material such as crystalline polypropylene, regenerated cellulose, vinyl chloride-vinyl acetate copolymer sheeting, natural rubber, synthetic elastomers, or polyvinylidene chloride. Polyethylene sheeting of 4 mils thickness has been found particularly satisfactory. The container is lifted by any suitable mechanical means such as a fork truck provided with a rotating head, inverted, moved onto rack 12, FIG. 3, preferably from the front side over plate 37 and within the vertical legs 38 of side angle irons 31 and 32. A stop block may be fixed to the plant floor in front of rack 12 in position as to facilitate preventing the rear side of the container from overriding flange 38 of rear angle iron 33. In accordance with the dimensions of the particular containers used, guide blocks 43 may be sized and positioned to provide for a plus or minus variance of e.g. ⅛–¼". Because of the flexible, more or less stretchable properties of the diaphragm, it will be understood that when the container is inverted and the weight of contents is taken by the diaphragm the latter will sag to some more or less extent depending upon variables such as nature of the material in the container, size of the container discharge port, and the physical characteristics and compositions of the diaphragm itself. In any given situation, normal sag of a diaphragm is readily determinable, and the arcuate dotted line 30 of FIG. 1 indicates representative sag, assuming no cutting of the diaphragm has been effected.

In the apparatus of FIG. 1, the upper edge of the connector 14, exclusive of compressibility of the gasket 74, is located just slightly below the level of the container seat on rack 12, and cutting blade positioning is such that the cutting teeth project about halfway into discharge throat 27 which may be say 1½" long axially. With this arrangement and using the type of connector of FIG. 1, it will be seen that, immediately the container is seated on rack 12, gasket 74 is compressed to form a substantially dust-tight seal between the upper end of the connector and the adjacent surface of the container, and the saw blade, cooperating with the normal sag of the diaphragm, substantially simultaneously with sealing by the gasket peripherally ruptures the diaphragm to the extent of the say 365° circumference of the blade. The cut portion of the diaphragm drops into the connector, but passage of diaphragm material into the receptacle along with solid material is prevented by the diaphragm uncut portion which retains the diaphragm material in attachment with the periphery of the container discharge port. Accordingly, it will be seen that the apparatus already described provides means which are operable and which act, when the container is seated in inverted position on the rack, to form a substantially dust-tight seal between the upper periphery of the connector and an adjacent peripheral portion of the container and to substantially simultaneously cut the diaphragm so as to effect flow of solid material thru the container discharge port into the connector and to maintain attachment of the diaphragm material to the discharge port periphery.

In the apparatus of FIG. 1, sealing and diaphragm rupturing are effected substantially immediately on seating of the container in the rack 12. In a preferred embodiment illustrated in FIGS. 5–7 sealing and diaphragm rupturing may be effected selectively either immediately on seating of the container in the rack 12 or at some subsequent desired time. Such flexibility of construction affords the advantage of facilitating feed of material to a receptacle thru a series of receptacle inlet ports at desired times independent of momentary availability of container moving equipment.

As indicated in FIG. 5, the lower end 101 of the connector 102 is designed to fit snugly and telescopically within the top-side inlet port and associated reinforcing ring 105 of receptacle 106. Projecting outwardly from about the vertical mid-point of the connector 102 is an annular flange 107 the under surface of which seats on the top side of an inflatable annulus 110, shown collapsed in FIG. 5, which circumferentially surrounds the connector and rests on ring 105. The upper end of connector 102 is provided with a sealing gasket 112, similar to that of FIG. 1, and near the upper end, connector 102 carries the interiorly disposed cutting blade 114 and supporting brackets 115, arrangement of blade and brackets being in general similar to that of FIG. 1. Vertical axial dimension of connector 102 above flange 107 and the relative positioning of gasket 112, blade 114 and brackets 115 are such that when annulus 110 is collapsed and the lower end of connector 102 is fully retracted within receptacle 106, gasket 112 in uncompressed condition is out of contact with the contiguous portion flat top 118 of the container which is seated in inverted position in the rack 12. Also, as shown in FIG. 5, vertical positioning of blade 114 in the connector 102 is such that when the connector is retracted the cutting edge of the blade lies sufficiently below, as indicated at 120, the adjacent diaphragm in its fully sagged position to avoid rupturing contact therewith. Gasket 112 and the cutting edge of blade 114 are axially spaced apart on the connector so that the clearance 122 between the top of gasket 112 and the underside of the container about equals the distance between the cutting edge of the blade 114 and the lower extremity of the container discharge port throat 123.

When annulus 110 is collapsed, a container may be placed on the rack and retained there with diaphragm uncut for any length of time before transferring material from the container into receptacle 106. When it is desired to effect such transfer it is only necessary to inflate the annulus, by means of suitable compressed air pipes, valves, etc. not shown, to the extent indicated at 125 in FIG. 7, and adequate upward movement of the connector 102 effects sealing by the gasket 112 and substantially simultaneous diaphragm rupturing by the cutting blade 114. Hence, the preferred embodiment of FIGS. 5–7 includes means operable, when the container is seated in inverted position on the rack, to form a substantially dust-tight seal between the upper periphery of the connector and an adjacent peripheral portion of the container and to cut the diaphragm so as to effect flow of solid material thru the container discharge port into the connector and to maintain attachment of material to the discharge port periphery. If desired, the annulus may be maintained in the inflated condition, in which situation it will be understood that the apparatus then functions the same as the connector of FIG. 1, i.e. immediately on seating of a container on the rack, sealing and diaphragm rupturing are effected substantially simultaneously.

For convenience, the invention has been described in connection with the use of circularly disposed cutting blades, and containers having substantially square horizontal cross-sections, flat tops, and circular discharge ports. Radially or diametrically disposed cutting blades, and other forms of containers may be employed. FIG. 8 indicates diagrammatically a container 130 having a substantially square horizontal cross-section throughout its major portion of its height, a frusto-pyramidal top section 131, and a discharge port 134 which may be substantially square or rectangular in horizontal plan. The upper corners of the main body portion of the container may have attached thereto angle iron legs 136 sufficiently long so that the lower ends bear on the supporting surface of a rack 137, the equivalent of rack 12 of FIG. 1. A conduit-connector and associated sealing and cutting facilities suitable for use in conjunction with container 130 would be substantially the same as the connector of FIG. 1 except for a change from circular to rectangular conformation in plan. In FIG. 9, the container 140 may be circular in horizontal cross-section and have a frusto-conical top end 141 terminating in a circular discharge port 142. The vertical location of a supporting rack 144 may be adjusted to cooperate with a weight bearing ring or annulus 147 welded or otherwise fixedly attached to the outer surface of the cylindrical container wall. The containers of FIGS. 8 and 9 each may be equipped with annular flanges 150 which function the same as container flat top 26, FIG. 1, to afford sealing surfaces adaptable for cooperation with the sealing gasket carried by the top end of a connector.

We claim:

1. Material handling apparatus comprising in combination a rigid-walled transportable bulk container adapted to hold dusty solid material and having a top-end discharge port, a flexible rupturable diaphragm attached to the periphery of said port and adapted to close the same and to retain material in said container when in vertically inverted position, a receptacle having a top-side inlet port, a unitary conduit connector including an open lower outlet end and an open upper inlet end having a peripheral dimension greater than that of said container discharge port, means for associating the connector outlet end and the receptacle inlet port in peripherally substantially dust-tight relation, means including a rack for receiving and supporting the weight of said container in vertically inverted position superjacent the connector inlet end and so that the inverted container discharge port is immediately adjacently associated with the connector inlet end in concentric relation, said conduit connector being non-fixedly associated with and movable with respect to each of said receptacle and rack, including first means operable, after the container has been fully seated and supported in inverted position on the rack, to form a substantially dust-tight seal between the upper periphery of the connector and an adjacent peripheral portion of the container and second means to cut said diaphragm in one stroke so as to effect substantially full flow of solid material thru the container discharge port into the connector and to maintain attachment to the discharge port periphery of substantially only enough diaphragm material to prevent any of the same from being carried into the connector.

2. Material handling apparatus comprising in combination a rigid-walled transportable bulk container adapted to hold dusty solid material and having a top-end discharge port, a flexible rupturable diaphragm attached to the periphery of said port and adapted to close the same and to retain material in said container when in vertically inverted position, a receptacle having a top-side inlet port, a unitary conduit connector including an open lower outlet end and an open upper inlet end having a peripheral dimension greater than that of said container discharge port and terminating in a peripherally formed upwardly projecting compressible sealing gasket, means for associating the connector outlet end and the receptacle inlet port in peripherally substantially dust-tight relation, means including a rack for receiving and supporting the weight of said container in vertically inverted position superjacent the connector inlet end and so that the inverted container discharge port is immediately adjacently associated with the connector inlet end in concentric relation, said conduit connector being non-fixedly associated with and movable with respect to each of said receptacle and rack, and means acting—after the container has been fully seated and supported in inverted position on the rack and the gasket is in compressed substantially dust-tight sealing engagement with an adjacent peripheral portion of the container—to substantially simultaneously cut said diaphragm in one stroke so as to effect substantially full flow of solid material thru the container discharge port into the connector and to maintain attachment to the discharge port periphery of substantially only enough diaphragm material to prevent any of the same from being carried into the connector.

3. The apparatus of claim 1 in which the container discharge port includes a short outwardly projecting neck to the periphery of which the diaphragm is attached; and the rack is vertically positioned relative to the top end of the connector so that, when the inverted container is seated on the rack, the terminal end of the neck projects into open upper inlet end of the connector in peripherally adjacent substantially nesting relation.

4. Apparatus of claim 1 in which the means for cutting the diaphragm comprises a cutter blade attached to the connector and formed and positioned to cut the diaphragm peripherally on a cut line adjacent the inner periphery of the container discharge port and extending for more than a major length of a complete peripheral cut but sufficiently short of a complete peripheral cut to maintain attachment of a diaphragm material to the container discharge port periphery.

5. Apparatus of claim 1 in which the means for cutting the diaphragm comprises a cutter blade formed to cut the diaphragm peripherally adjacent the inner periphery of the container discharge port, said blade being supported interiorly of the connector and vertically positioned so as to cooperate with the normal sag of the uncut diaphragm to effect the said cutting thereof.

6. The apparatus of claim 1 in which the means for cutting the diaphragm includes a peripheral cutter blade attached to the connector and formed and positioned to cut the diaphragm peripherally and adjacent the inner periphery of the container discharge port: and in which apparatus the rack includes container seating guides set to receive and seat a container having a seating portion of permissible dimensional variance value $x$; said peripheral cutter blade being positioned so that the radial dimension from the vertical axis of the connector to the peripheral blade is less than the corresponding radial dimension of the container discharge port by an amount at least $1.5x$.

7. The apparatus of claim 6 in which the peripheral cutter blade is positioned so that the radial dimension from the vertical axis of the connector to the peripheral blade is less than the corresponding radial dimension of the container discharge port by an amount in the range of $2x$–$3x$.

8. The apparatus of claim 6 in which dimensions are in inches, and $x$ is in the range of zero–½ inch.

9. The apparatus of claim 6 in which the dimensions are in inches, $x$ is in the range of zero–½ inch, and the peripheral cutter blade is positioned so that the radial dimension from the vertical axis of the connector to the peripheral blade is less than the corresponding radial dimension of the container discharge port by an amount in the range of $2x$–$3x$.

10. Material handling apparatus comprising in combination a rigid-walled transportable bulk container adapted to hold dusty solid material and having a top-end discharge port, a flexible rupturable diaphragm attached to the periphery of said port and adapted to close the same and to retain material in said container when in vertically inverted position, a receptacle having a top-side inlet port, a unitary conduit connector including an open lower outlet end and an open upper inlet end having a peripheral dimension greater than that of said container discharge port and terminating in a peripherally formed upwardly projecting compressible sealing gasket, means for associating the connector outlet end and the receptacle inlet port in peripherally substantially dust-tight relation, means including a rack for receiving and supporting the weight of said container in vertically inverted position superjacent the connector inlet end and so that the inverted container discharge port is immediately adjacently associated with the connector inlet end in concentric relation, said conduit connector being non-fixedly associated with and movable with respect to each of said receptacle and rack, including first means acting, after the container has been fully seated and supported in inverted position on the rack, to compress the gasket into substantially dust-tight sealing engagement with an adjacent peripheral portion of the container, and second means to substantially simultaneously cut said diaphragm in one stroke so as to effect substantially full flow of solid material thru the container discharge port into the connector and to maintain attachment to the discharge port periphery of substantially only enough diaphragm material to prevent any of the same from being carried into the connector.

11. The apparatus of claim 10 in which the said rack includes a seat for supporting the container and the rack is vertically positioned so that the said seat is substantially level with the top end of the connector exclusive of compressibility of the gasket; and in which apparatus the means for cutting the diaphragm comprises a cutter blade formed to cut the diaphragm peripherally adjacent the inner periphery of the container discharge port; said blade being supported interiorly of the connector and vertically positioned so as to cooperate with the normal sag of the uncut diaphragm to effect the said cutting thereof.

12. Material handling apparatus comprising in combination a rigid-walled transportable bulk container adapted to hold dusty solid material and having a top-end discharge port, a flexible rupturable diaphragm attached to the periphery of said port and adapted to close the same and to retain material in said container when in vertically inverted position, a receptacle having a top-side inlet port, a unitary conduit connector including an open lower outlet end and an open upper inlet end having a peripheral dimension greater than that of said container discharge port, means for associating the connector outlet end and the receptacle inlet port in peripherally substantially dust-tight relation, means including a rack for receiving and supporting the weight of said container in vertically inverted position superjacent the connector inlet end and so that the inverted container discharge port is immediately adjacently associated with the connector inlet end in concentric relation, said conduit connector being non-fixedly associated with and movable with respect to each of said receptacle and rack, and pneumatically actuated means operable, when the container is seated in inverted position on the said rack, to form a substantially dust-tight seal between the upper periphery of the connector and an adjacent peripheral portion of the container and to cut said diaphragm so as to effect flow of solid material through the container discharge port into the connector and to maintain attachment of diaphragm material to the discharge port periphery.

13. The apparatus of claim 12 in which the said pneumatically actuated means, for forming the seal between the connector and the container and for cutting the diaphragm, are operable selectively on seating of the container on the rack or at a desired time interval thereafter.

14. The apparatus of claim 12 in which the said pneumatically actuated means effects formation of the seal between the connector and the container and substantially simultaneously cuts the diaphragm.

15. Material handling apparatus comprising in combination a rigid-walled transportable bulk container adapted to hold dusty solid material and having a top-end discharge port, a flexible rupturable diaphragm attached to the periphery of said port and adapted to close the same and to retain material in said container when in vertically inverted position, a receptacle having a top-side-inlet port, a rack for receiving and supporting the weight of said container in vertically inverted position above and substantially coaxial with the receptacle inlet port, a vertically movable unitary conduit connector coaxially disposed between the rack and the receptacle and including an open lower outlet end and an open upper inlet end having a peripheral dimension greater than that of said container discharge port and terminating in a peripherally formed upwardly projecting compressible sealing gasket, means for telescopically associating the connector outlet end and the receptacle inlet port in peripherally substantially dust-tight relation, an upwardly directed cutting blade carried interiorly by said connector, and means operable, when the container is seated in inverted position on the said rack, to raise the connector so as to move the gasket into compressed substantially dust-tight sealing engagement with an adjacent peripheral portion of the container, and so as to cut said diaphragm so as to effect flow of solid material through the container discharge port into the connector and to maintain attachment of diaphragm material to the discharge port periphery.

16. The apparatus of claim 15 in which the means for raising the connector is pneumatically actuated, and connector-container sealing and diaphragm cutting are effected substantially simultaneously.

17. Apparatus of claim 15 in which the means for cutting the diaphragm comprises a toothed cutter blade formed and positioned to cut the diaphragm peripherally, adjacent the inner periphery of the container discharge port, sufficiently short of a complete peripheral cut to maintain attachment of diaphragm material to the container discharge port periphery, and the means for raising the connector includes an inflatable annulus peripherally surrounding the connector and bearing on the receptacle.

References Cited in the file of this patent

UNITED STATES PATENTS

| | | |
|---|---|---|
| 2,047,242 | Young | July 14, 1936 |
| 2,107,995 | Statham et al. | Feb. 8, 1938 |
| 2,198,564 | Robison | Apr. 23, 1940 |
| 2,831,591 | Morton | Apr. 22, 1958 |